United States Patent [19]

Coulmance et al.

[11] 4,357,652
[45] Nov. 2, 1982

[54] LIGHT PROJECTOR EQUIPPED WITH A LOW-VOLTAGE INCANDESCENT LAMP AND INCORPORATING A RELAY

[75] Inventors: Jean-Pierre R. Coulmance, Osny; Jean-Pierre Ricouard, Suresnes, both of France

[73] Assignee: U.S. Philips Corporation, New York, N.Y.

[21] Appl. No.: 161,953

[22] Filed: Jun. 23, 1980

[30] Foreign Application Priority Data

Jun. 29, 1979 [FR] France .............................. 79 16971

[51] Int. Cl.³ .......................................... F21V 23/04
[52] U.S. Cl. .................................. 362/276; 362/295; 362/802; 315/159
[58] Field of Search ................ 315/159, 151; 362/253, 362/257, 295, 458, 802, 276

[56] References Cited

U.S. PATENT DOCUMENTS

| 2,240,843 | 5/1941 | Gillespie | 315/151 |
|---|---|---|---|
| 3,336,473 | 8/1967 | Buzan | 362/20 |
| 3,493,761 | 2/1970 | Brightman | 315/151 |
| 3,609,450 | 9/1971 | Hart | 315/151 |
| 3,746,918 | 7/1973 | Drucker et al. | 315/159 |
| 3,751,711 | 8/1973 | Schick | 362/802 |
| 3,983,452 | 9/1976 | Bazin | 315/397 |
| 4,031,430 | 6/1977 | Enomoto | 315/397 |

Primary Examiner—Peter A. Nelson
Attorney, Agent, or Firm—Robert T. Mayer; Bernard Franzblau

[57] ABSTRACT

A motor-car headlight with a built-in static relay.

The headlight lamp is connected in series with a power phototransistor with which it is optically coupled. Turn on and turn off of the phototransistor is effected by temporarily changing the base voltage.

11 Claims, 4 Drawing Figures

LIGHT PROJECTOR EQUIPPED WITH A LOW-VOLTAGE INCANDESCENT LAMP AND INCORPORATING A RELAY

The present invention relates to a light projector equipped with a low-voltage incandescent lamp and incorporating a switch, said projector being constituted by a shell which is internally coated with a reflecting metallic layer and which is provided with a socket comprising at least two contacts.

The invention, more specifically, though not exclusively, relates to headlights for motor vehicles.

The large current associated with the high power headlight lamps of motor vehicles makes it necessary to minimize the length of the power-supply conductors in order to save copper and to reduce the voltage drop across the line.

For this purpose the on-off control of the headlights from the driver's seat is effected via conductors of small cross-section, which are connected to the coils of electro-magnetic relays disposed in the direct proximity of the headlight.

The reliability of such a system is not perfect because of the gradual deterioration of the switching performance as a result of wear or soiling of the relay contacts.

In order to remedy this drawback, use has been made of static relays or switches constituted by power transistors. The lamps to be controlled are then connected in series with the collector-emitter path of said transistors. However in this case the voltage loss of a power transistor in the saturated state may be as high as some hundreds of millivolts and thus reduces the actual supply voltage of the lamp which it controls by the same amount.

Moreover, when the lamp is lit continuously, a substantial heat dissipation which should be drained by means of a heat sink. In a similar manner as for an electro-magnetic relay, maintaining the transistor in the saturated state demands a substantial control current, which prohibits pulse control and necessitates the use of a bistable control circuit with a large output current.

It is an object of the invention to realize a projector incorporating a static relay whose voltage drop is substantially negligible and which can be turned on and turned off by means of short pulses, which may be supplied by a microprocessor.

According to the invention the light projector, which is equipped with a low-voltage incandescent lamp and incorporates a switch, said projector being constituted by a shell which is internally coated with a reflecting metallic layer and which is provided with a socket comprising at least two contacts, is characterized in that the lamp is connected in series with the collector-emitter path of a phototransistor which is arranged so as to intercept a fraction of the luminous flux emitted by said lamp.

Suitably, the phototransistor is disposed at the end of a tube which terminates in the interior of the shell.

The emitter of the phototransistor is connected directly to the socket holding the lamp and the collector is connected to the positive battery terminal. If the base is momentarily brought to the collector voltage, the phototransistor will operate in the saturation state, the lamp will be turned on and will remain on when the base is disconnected because the base current is then obtained via the luminous flux which is incident on the phototransistor. Conversely, turn off is effected by briefly bringing the base to the emitter potential.

Since the voltage loss VCE SAT of a phototransistor is very low, of the order of 100 millivolts, the lamp substantially receives the full battery voltage. Moreover, as a result of the low heat dissipation the use of a large heat sink is no longer necessary.

Turning the light on or off by temporarily changing the base voltage provides a great flexibility in design. Switching can be accomplished either by the use of mechanical temporarily closed contacts or by electric pulses obtained from a central information processing system of the vehicle. Furthermore, in the arrangement which is used for the power supply circuit of the phototransistor, the value of the base-emitter voltage of the phototransistor provides an indication of the state of the lamp (lit, extinguished or short-circuited).

The invention will be described in more detail by way of example with reference to the drawings in which FIG. 1 represents the circuit diagram of the projector in accordance with the invention.

FIG. 2 represents a variant of the circuit of FIG. 1 which is provided with a means for protecting the circuit against inadvertent turn-on.

Figure 1:
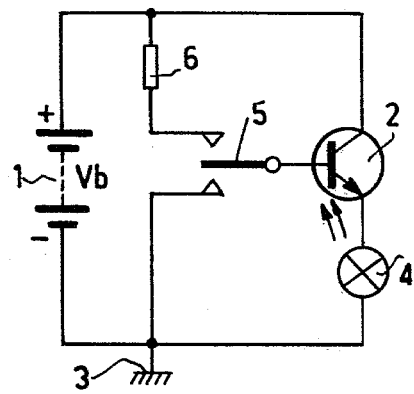

In FIG. 1 the positive terminal of a source 1 of direct voltage Vb is connected to the collector of an NPN type phototransistor 2. The other terminal of said source is connected to a common ground point 3 and to the emitter of the phototransistor 2 via an incandescent lamp 4.

The base of the phototransistor 2 is connected to the common contact of a single-pole switch 5 which automatically returns to the neutral position, the upper contact of said switch being connected to the positive terminal of the source Vb via a resistor 6 and the lower contact being connected directly to the negative terminal.

When the switch 5 is in the neutral position, the phototransistor 2 is cut off if the base-emitter junction is not illuminated. When the switch 5 is set to the upper position, the phototransistor 2 is bottomed and the lamp 4 lights up. As a result of the optical coupling between the lamp and the base of the phototransistor the return of the switch 5 to the neutral position does not affect the state of the circuit which keeps itself saturated.

When the switch 5 is set to the lower position, the phototransistor 2 is cut off and the lamp 4 extinguishes. The return of the switch 5 to the neutral position has no effect on this situation because the base-emitter junction is not illuminated.

From the foregoing it follows that an accidental illumination of the phototransistor could cause the lamp 4 to be turned on inadvertently without the switch 5 having been actuated.

Figure 2:
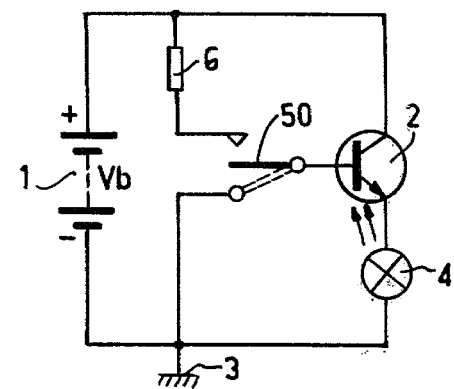

The circuit of FIG. 2 eliminates this problem.

The switch 5 of FIG. 1 is replaced by a switch 50 whose upper position is an automatic reset position, whereas the lower position can be held. Further turning on is effected in the same way as in the case of FIG. 1 with an automatic return to the neutral position, whereas turning off is effected with the contact being held in the lower position, thus avoiding inadvertent switching on.

Figure 3:
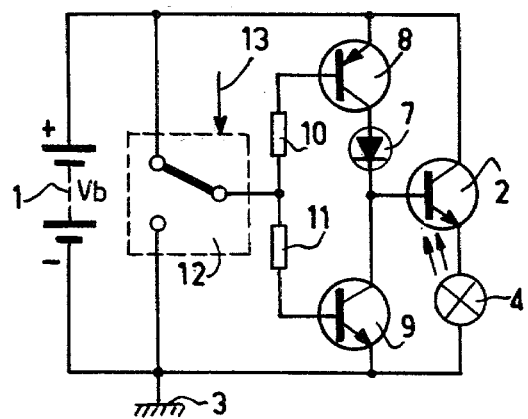
FIG. 3 represents a control circuit for the projector in accordance with the invention using logic signals.

In FIG. 3, in which the same reference numerals are used as in FIGS. 1 and 2, the base of the phototransistor 2 is connected to the cathode of a diode 7, whose anode is connected to the collector of a first transistor 8 of the PNP-type, and to the collector of a second transistor 9 of the NPN-type.

The emitter of the transistor 8 and the emitter of the transistor 9 are respectively connected to the positive and negative terminals of the source Vb, whereas the bases are connected to the common contact of a single-pole switch 12 via two resistors 10 and 11. The other two contacts of said switch are respectively connected to the two terminals of the source Vb.

When the switch 12 is in the upper position, transistor 8 is cut off and transistor 9 is bottomed, which makes it impossible to switch on the lamp 4. When the switch 12 is in the lower position, transistor 9 is cut off and transistor 8 is turned on via the diode 7, the base-emitter junction of the phototransistor 2 and the lamp 4, so that said phototransistor is bottomed. At this instant the base-emitter voltage of the phototransistor increases and the diode is cut off, thus disconnecting the base of the phototransistor, which remains conductive by self-saturation, from the rest of the circuit.

If the switch 12 is an electronic switch, for example of the bistable multivibrator type, a brief control pulse at an input 13 suffices to change it from the on-state to the off-state and the other way round.

It is to be noted that the "off" position, in the upper position of the switch 12, in a similar way as in the circuit of FIG. 2, prevents any inadvertent switching on of the lamp 4 by holding the base of the phototransistor 2 at ground potential (when ignoring the voltage loss).

Figure 4:
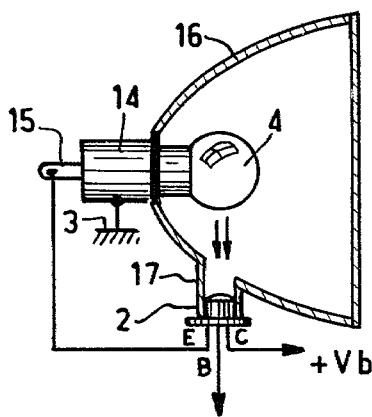
FIG. 4 is a partial cross-section of an embodiment of the projector in accordance with the invention.

In FIG. 4, in which the same reference numerals are used as in FIGS. 1, 2 and 3, the projector in accordance with the invention comprises a socket 14 which holds the lamp 4, said socket having one insulated contact 15, the other contact being connected to the ground point 3.

The shell 16 of the projector, which is shown in cross-section, is provided with a tube 17 at the end of which the phototransistor 2 is arranged so as to intercept a fraction of the luminous flux from the lamp 4. The upper part of said phototransistor may be provided with an optical system which concentrates the luminous flux at the base-emitter junction.

The phototransistor which is used is a power transistor having a large base area and is provided with a transparent casing. it is evident that it may also be of the PNP-type. Similarly, the lamp may be included in series in the collector circuit if the socket 14 is insulated from ground, or if the latter is connected to the positive battery terminal.

We claim:

1. A light projector comprising a low-voltage incandescent lamp, a shell which is internally coated with a reflecting metallic layer and which includes a socket for the lamp comprising at least two electric contacts, a phototransistor, means including said two electric contacts for connecting the lamp and phototransistor in series to a source of voltage, the phototransistor being arranged so as to intercept a fraction of the luminous flux emitted by said lamp, and means for switching the base of the phototransistor to the source of voltage.

2. A light projector as claimed in claim 1, wherein the phototransistor is disposed at the end of a tube which terminates in the interior of the shell so as to couple said luminous flux from the shell interior to the phototransistor.

3. A light projector as claimed in claims 1 or 2, wherein the voltage source is a battery and the switching means comprises a single-pole switch and the base of the phototransistor is connected to a common contact of the single-pole switch which is automatically reset to a neutral position, said switch having two other contacts respectively connected to the terminals of the battery which energizes the lamp.

4. A light projector as claimed in claims 1 or 2, wherein the switching means comprises a single-pole switch and the base of the phototransistor is connected to a common contact of the single-pole switch, said switch automatically returning to a neutral position in the "lit" state of the lamp and having a contact which holds the lamp in the "extinguished" state.

5. A light projector as claimed in claims 1 or 2, wherein the base of the phototransistor is connected to a first terminal of the voltage source of the projector via a diode connected in series with the collector-emitter path of a first transistor, and means coupling said base to the other terminal of the voltage source via the collector-emitter path of a second transistor of a conductivity type opposite to that of the first transistor.

6. A light projector as claimed in claim 5 wherein said switching means comprises a single-pole switch having a common contact and two other contacts and the bases of the first and second transistors of opposite conductivity type are each connected to the common contact of the single-pole switch via a resistor, the two other contacts of said switch being connected to the terminals of the voltage source.

7. A light projector as claimed in claim 5 wherein said switching means comprises a bistable multivibrator device having a trigger-pulse input terminal for triggering the multivibrator between first and second stable states, and means coupling the bases of the first and second transistors to an output terminal of the multivibrator device via first and second resistors, respectively, thereby to selectively control the conduction of said first and second transistors.

8. An electro-optic device comprising, a housing, an electrically energizable light source mounted in said housing, a photosensitive element connected in series circuit with said light source to a source of supply voltage and mounted so as to be shielded from any external light source and optically coupled solely to said electrically energizable light source so as to receive a fraction of the luminous flux emitted by said light source, and switch means coupled to a control electrode of said photosensitive element for selectively coupling the control electrode to the source of supply voltage to initiate current flow in said series circuit whereby the light source maintains current conduction in the photosensitive element and light source by means of said optically coupled fraction of emitted luminous flux after the switch means decouples the control electrode from said voltage source.

9. An electro-optic device as claimed in claim 8 wherein said light source comprises an incandescent lamp and said photosensitive element comprises a phototransistor which controls the operating voltage of the lamp solely as a function of said fraction of luminous flux emitted by the lamp.

10. An electro-optic device as claimed in claim 8 or 9 wherein said switch means has a first state in which the control electrode is coupled to a first potential that turns the phototransistor element on, a second state by which the control electrode is effectively decoupled from the voltage source, and a third state in which the control electrode is coupled to a second potential that holds the photosensitive element in cut-off.

11. An electro-optic device as claimed in claim 8 or 9 wherein said housing comprises the shell of a motor vehicle headlight internally coated with a light reflecting material and the light source comprises a low-voltage incandescent lamp, said shell including a socket for mounting the lamp within the shell and said switch means being operative to briefly couple the control electrode of the photosensitive element to a potential that turns the photosensitive element on and then decouples said control electrode from said potential.

* * * * *